United States Patent

Siby

[15] 3,688,886
[45] Sept. 5, 1972

[54] BILL INDICATOR AND THE LIKE
[72] Inventor: Sture Siby, Vasteras, Sweden
[73] Assignee: Allmanna Svenska Elektriska Aktiebolaget, Vasteras, Sweden
[22] Filed: Nov. 12, 1970
[21] Appl. No.: 88,862

[30] Foreign Application Priority Data
Nov. 18, 1969 Sweden .................15794/69

[52] U.S. Cl. ...........194/4 R, 209/DIG. 2, 340/149 A
[51] Int. Cl. .............................................G07d 7/00
[58] Field of Search ........194/4; 33/169 F; 340/149, 340/149 A; 209/DIG. 2, 73; 235/61.11 K

[56] References Cited
UNITED STATES PATENTS
3,443,107  5/1969  Modglin.....................194/4 R

OTHER PUBLICATIONS

Applicant' s Disclosure of That Which Is Old in the Art: FIG. 4 and Pages 3 and 4 of the Specification.

*Primary Examiner*—Samuel F. Coleman
*Assistant Examiner*—Thomas E. Kocovsky
*Attorney*—Kenyon & Kenyon

[57] ABSTRACT

A device for determining the genuineness of documents, such as paper bills. The bill is clamped between two planes. One plane has spacing ridges which abut against the paper thickness outside the printed surface pattern, and a plunger abuts against the top of the printed surface pattern at some selected portion thereof to measure the height of the printed surface at that portion above the thickness of the paper.

5 Claims, 4 Drawing Figures

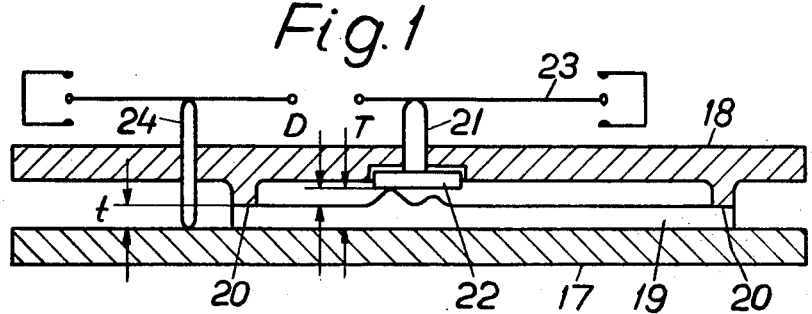
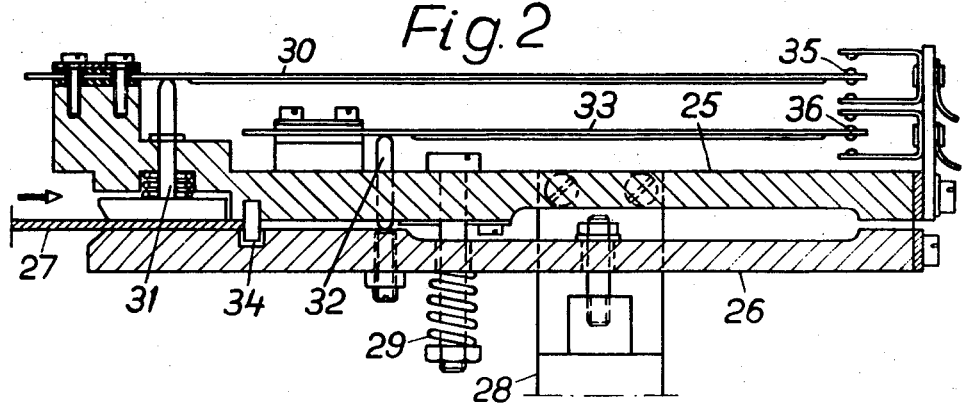
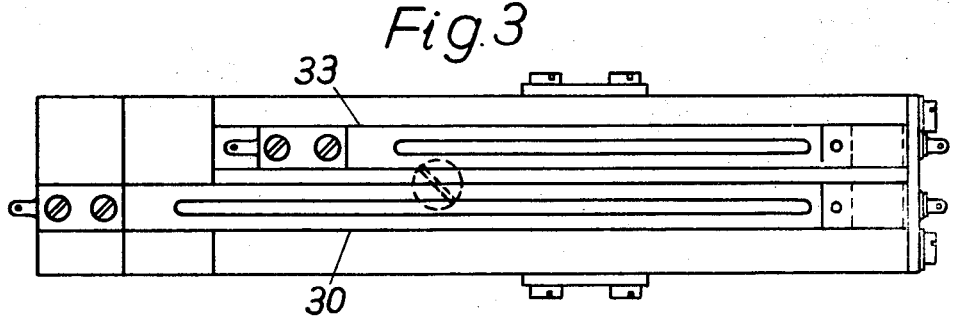
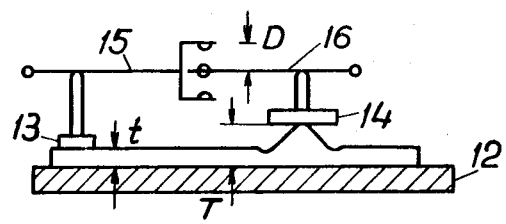
INVENTOR.
STURE SIBY

BILL INDICATOR AND THE LIKE

The present invention relates to an indicator for identifying bills and other valuable documents, and possibly for initiating delivery of goods, such as filling with petrol.

A considerable number of different types of indicators are already known, which are based on measuring various data on a bill, for example translucency, light reflection, paper thickness, maximum and minimum surface pattern, exactitude of simultaneous printing, color composition, the mechanical properties of the paper, etc., and sometimes combinations of these measurements. All these measuring methods permit a slight risk of forgery, as with a certain amount of work these various characteristics can be copied in a forged bill, or the apparatus becomes complicated, expensive and often very sensitive.

A greater degree of certainty can be achieved by selecting two characteristic portions of a bill, for example a small part of the surface pattern and a part outside, and then comparing the height of the peaks in just this portion with the height outside the printed part (or the bottom of the pattern on the other part) and obtaining a difference signal which is extremely difficult to reproduce and thus a relatively reliable gauge as to whether a bill is genuine or not. This signal may then be supplemented by conventional optical measuring signals (photocells), for example to check the value of the bill and the correct direction of insertion.

One problem with the latter type of indicator is to obtain reliable operation even after the indicator has been in use for some time, and to be able to bring down the manufacturing and service costs.

The invention is a solution of these and other similar problems and is characterized in that the indicator has two measuring planes, movable in relation to each other, for example one stationary and one movable, between which the bill can be inserted and clamped, a measuring device being arranged in one of these planes to measure the height or position of the top of the surface pattern at a characteristic part of the bill clamped in the plane, the output signal of the device thus being a gauge of the difference between pattern height and thickness. Such an indicator permits the use of parts which are not so movable and of a type giving much greater safety against damage, altering shape of the components and very little need of electrical connections and measuring devices. A measurement of the paper thickness is obtained automatically, which may sometimes vary for genuine bills, for example older or newer bills, and by subtracting this measurement from the peak height (at the characteristic part of the surface pattern, water-mark or other part of the bill) a difference signal is obtained which gives a reliable value, difficult to copy, indicating if the bill is genuine.

In a preferred embodiment one of the planes is provided with heels or the like for abutment against the bill outside the section provided with surface pattern, so that the difference-measuring device without electrical addition or subtraction gives a direct measurement of the difference in pattern height at the characteristic part and thickness of the paper in the bill.

Suitably the indicator may be supplemented by a separate device to measure the thickness of the bill, in order to check the paper thickness, and this device may be applied at one of the planes, but is otherwise independent of the difference-measuring device.

The indicator is further explained in the accompanying FIGS. 1 - 3, in which:

FIG. 1 is a diagrammatic sketch of the function of the indicator and

FIGS. 2 and 3 an example of an indicator.

FIG. 4 shows the previously used difference-measuring principle described above.

FIG. 4 shows in principle a bill (as shown in U.S. Pat. 3,590,992-Soderstrom) indicator successfully used in the past which, however, is rather sensitive. A bill 11 is fed into a measuring station having a measuring plane 12. A plunger 13 is pressed down against the outer edge or against some other characteristic part of the bill, in the latter case having a limited area, and the position of the plunger 13 is indicated by means of a contact arm 15. Thus, either a gauge of the paper thickness at the side of the surface printing is obtained or of the position of the bottom of the pattern at a certain characteristic part of the bill. At another characteristic part of the bill, the top height or position of the pattern (in steel depth printing and/or water marks or the like) is then measured by another plunger 14, and this value is also transmitted to a contact arm 16. The relative positions of the contacts at the contact arms is thus a measurement of said difference. These contact arms and other contact devices require rather considerable movement of the plungers, etc., and the difference signal is obtained only after combination of the two partial signals, which means that the device is sensitive.

FIG. 1 shows the principle of the indicator according to the present invention. Between a lower measuring plane 17, suitably stationary, and an upper measuring plane 18, suitably movable, or plane 18 stationary and plane 17 movable, a bill 19 is fed or inserted, or some other valuable document having a surface pattern, such as a specially prepare check or the like. The upper (or lower measuring plane 17, 18) is provided with heels 20 or similar spacers, arranged to abut against the paper outside the printed part and/or the water mark, if any, of the surface pattern.

In the upper or lower measuring plane is a spring-loaded plunger 21 (or more than one) having a measuring surface 22 which, when the bill 19 is clamped between the two measuring planes 17, 18, is pressed against the tops of the surface pattern at some suitably selected, characteristic part of the bill, in order to measure the height of the pattern (D) at just this portion of the bill, not known to anyone else. Since the heels 20 abut the paper of the bill, the output signal from the plunger 21 is a measurement of the difference between the pattern height (D) at a certain portion and the thickness of the bill $(T - t)$, and this signal is a good parameter to determine whether the bill is genuine or not. The signal can most simply be taken out through a single contact arm 23 having contacts movable between different end position contacts, preferably adjustable, possibly even by an exchange. These end positions can suitably be set so that a bill inserted definitely acquires a value for $T - t = D$ which falls within the limits for a genuine bill. Calibration may also easily be carried out on a genuine bill.

Besides this difference-measuring device, one of the planes 17, 18 may also be provided with a plunger 24 to measure the thickness of a bill (within or outside the part of the bill provided with surface pattern) and this output signal may also be read in the same way (compared with a standard value).

The device according to FIG. 1 may be supplemented by conventional devices for optical measurement of the bill, for example by means of light let through and light reflected, received by appropriate photocells.

FIGS. 2 and 3 show in horizontal and vertical projection one example of a bill indicator according to the invention.

The upper measuring plane is shown at 25 and the lower at 26. At 27 a bill is shown which is just being inserted between the measuring planes. Here the upper measuring plane is stationary and the lower movable with the help of an electromagnet 28 activated by at least one spring 29. When the action of the magnet ceases the bill is clamped between the planes 17, 18. The magnet may possibly be arranged for the opposite effect. The measuring plunger 30 for the difference measuring is shown at 30 and its contact arm at 31 (see also FIG. 3), and the measuring plunger for the thickness of the bill is shown at 32 and its contact member at 33.

A bill which is to be examined to see if it is genuine, is fed in at the arrow in FIG. 2 and must be placed in a gap (not shown) after a hatch has been pushed aside (not shown). One condition that the subsequent measurement shall take place is that the hatch is closed. If it is opened, the measurement is blocked, and this gives an extra safety measure.

When the bill has arrived in position (with the edge against a stop 34) the action of the magnet 28 ceases and the bill is clamped by means of spring action (from 29). The measuring plungers are pressed against their respective portions of the bill and difference and measuring signals are taken out at 35 and 36, respectively. If these signals are within the permitted limits, no contact is obtained at 35 or 36 and the bill is released and transported further to a collection point and the delivery of goods (petro, tinned goods, drinks, change, clothes, chocolate, or whatever the indicator is being used for) can be effected.

As mentioned, this indicator may be supplemented by optical sensing or some other type of sensing. The number of measuring points may also be increased in order to increase the reliability. The measuring plungers 30 and 32 should be movable both lengthwise and laterally in relation to the bill and the measuring plane 18 may possibly be provided with plungers for different levels.

The invention can be varied in other ways within the scope of the following claims.

I claim:

1. Indicator for indicating bills and other valuable documents and possibly for initiating delivery of goods, such as filling with gasoline, changing coins etc., said indicator having two measuring planes, movable in relation to each other, for example one stationary and one movable, said planes being movable to a measuring position, where a bill is inserted and clamped between said planes, the space between which being a measurement of the bill paper thickness, a measuring device being arranged in one of these planes and movable in relation to the same and being into contact with a characteristic part of the clamped bill, the measuring position of said device being a measure signal for the pattern height of the bill as its characteristic part, the output signal of the device thus being a gauge of the difference between pattern height at the characteristic portion of the bill and the bill paper thickness.

2. Indicator according to claim 1, in which the difference-measuring device is adjustable to its position in relation to the clamped bill.

3. Indicator according to claim 1, in which said difference signal is fed to control devices for at least one driving member in such a way that when both these signals are within their respective limits, the bill is fed to a collection point and the delivery of goods is initiated, but that this function is blocked when at least one of the signals falls outside the respective limits.

4. Indicator according to claim 1, in which the difference-measuring device consists of a spring-loaded plunger having a measuring head intended to be pressed down against a characteristic part of a clamped bill, said plunger being in one of the measuring planes and arranged to activate a contact member movable between two, suitably adjustable end-position contacts.

5. Indicator according to claim 4, characterized in that at least one of the measuring planes is provided with heels for abutment against a clamped bill, suitably outside steel depth printing and other parts of the bill provided with surface pattern, the signal of the difference member thus being dependent on the difference between the pattern height and the thickness of the paper bill.

* * * * *